US009849566B2

(12) United States Patent
Bennett et al.

(10) Patent No.: US 9,849,566 B2
(45) Date of Patent: Dec. 26, 2017

(54) ARMORER'S BLOCK

(71) Applicant: Magpul Industries Corp., Boulder, CO (US)

(72) Inventors: William Bradley Bennett, Lafayette, CO (US); Michael T. Mayberry, Denver, CO (US); Duane Liptak, Erie, CO (US)

(73) Assignee: Magpul Industries Corp., Austin, TX (US)

( * ) Notice: Subject to any disclaimer, the term of this patent is extended or adjusted under 35 U.S.C. 154(b) by 394 days.

(21) Appl. No.: 14/679,587

(22) Filed: Apr. 6, 2015

(65) Prior Publication Data

US 2015/0290775 A1 Oct. 15, 2015

Related U.S. Application Data

(60) Provisional application No. 61/979,934, filed on Apr. 15, 2014.

(51) Int. Cl.

| | |
|---|---|
| ***B23Q 3/00*** | (2006.01) |
| ***B25B 1/24*** | (2006.01) |
| ***B25B 11/00*** | (2006.01) |

(52) U.S. Cl.

CPC ............ *B25B 1/2463* (2013.01); *B25B 11/00* (2013.01)

(58) Field of Classification Search

USPC ....................................... 269/71, 75, 95, 271

See application file for complete search history.

(56) References Cited

U.S. PATENT DOCUMENTS

| | | | | |
|---|---|---|---|---|
| 4,873,777 | A | 10/1989 | Southard | |
| 8,209,896 | B1 | 6/2012 | Cashwell | |
| 8,322,068 | B2 | 12/2012 | Wilson | |
| 8,572,884 | B1 | 11/2013 | Saur | |
| 8,590,203 | B1 | 11/2013 | McCarthy et al. | |
| 8,931,201 | B2 | 1/2015 | Gianladis et al. | |
| 2006/0218840 | A1 | 10/2006 | Cauley | |
| 2010/0281748 | A1 | 11/2010 | Parry et al. | |
| 2012/0222344 | A1 | 9/2012 | Werner | |
| 2012/0255212 | A1 | 10/2012 | Werner | |
| 2014/0165439 | A1 * | 6/2014 | Fernandez ............. | F41A 17/38 42/6 |
| 2016/0161204 | A1 * | 6/2016 | Geissele ................ | B25B 13/48 29/525.11 |

(Continued)

OTHER PUBLICATIONS

Geissele Automatics, "AR15/M4 Reaction Rod", Webpage found at http://geissele.com/reaction-rod.html Inventor(s) aware of prior art on or before Apr. 29, 2015, p. 2 Published in: US.

(Continued)

*Primary Examiner* — Joseph J Hail
*Assistant Examiner* — Shantese McDonald
(74) *Attorney, Agent, or Firm* — Neugeboren O'Dowd PC

(57) ABSTRACT

A gunsmithing block is disclosed. The gunsmithing block has a first end for interfacing with a vice, and a second end shaped to interface with an upper receiver assembly of a firearm, the upper receiver assembly having an upper receiver, a bolt carrier without a bolt, and a barrel extension. The second end has an upper receiver mating portion shaped to interface with an interior region of the upper receiver and an interior region of the barrel extension. Methods of using and making a gunsmithing block are also disclosed.

18 Claims, 14 Drawing Sheets

(56) References Cited

U.S. PATENT DOCUMENTS

2016/0202008 A1* 7/2016 Geissele ................. F41A 11/00 42/108

OTHER PUBLICATIONS

Wheeler Engineering, "Delat Series AR Armorers Vise", Webpage found at http://www.midwayusa.com/product/865390/wheeler-engineering-delta-series-ar-armorers-vise Inventor(s) aware of prior art on or before Apr. 30, 2014, p. 3 Published in: US.

Crosstac, "Crosstac Armorer's Action Block AR-15", Webpage found at http://www.midwayusa.com/product/453530/crosstac-armorers-action-block-ar-15 Inventor(s) aware of prior art on or before Apr. 30, 2014, p. 2 Published in: US.

DPMS Panther Arms, "DPMS 'The Flipper' Action Block AR-15 Delrin", Webpage found at http://www.midwayusa.com/product/684804/dpms-the-flipper-action-block-ar-15-delrin Inventor(s) aware of prior art on or before Inventor(s) aware of prior art on or before Apr. 30, 2014, p. 2 Published in: US.

Brownells, "AR15/M16 Barrel Extension Torque Tools", Webpage found at http://www.brownells.com/gunsmith-tools-supplies/rifle-tools/barrel-tools/ar-15-m16-barrel-extension-torque-tools-prod27452.aspx Inventor(s) aware of prior art on or before Apr. 29, 2015, p. 2 Published in: US.

Wheeler Engineering, "Wheeler Engineering Delta Series Adjustable Receiver Link AR-15", Webpage found at http://www.midwayusa.com/product/774225/wheeler-engineering-delta-series-adjustable-receiver-link-ar-15 Inventor(s) aware of prior art on or before Apr. 30, 2014, p. 2 Published in: US.

Wheeler Engineering, "Wheeler Engineering Delta Series Upper Receiver Vise Block Clamp AR-15", Webpage found at http://www.midwayusa.com/product/210021/wheeler-engineering-delta-series-upper-receiver-vise-block-clamp-ar-15 Inventor(s) aware of prior art on or before Apr. 30, 2014, p. 3 Published in: US.

Wheeler, "Wheeler Delta Series AR-15 Mag Well Vise Block", Webpage found at http://www.walmart.com/ip/Wheeler-156211-AR-15-Mag-Well-Vise-Block-Delta-Series/37376341 Inventor(s) aware of prior art on or before Apr. 30, 2014, p. 6 Published in: US.

* cited by examiner

ARMORER'S BLOCK

CROSS-REFERENCE TO RELATED APPLICATIONS

This application claims priority to U.S. Provisional Application No. 61/979,934 filed Apr. 15, 2014 and entitled "ARMORER'S BLOCK," the entire disclosure of which is hereby incorporated by reference for all purposes, as if fully set forth herein.

FIELD OF THE DISCLOSURE

The present disclosure relates generally to gunsmithing. In particular, but not by way of limitation, the present disclosure relates to systems, methods and apparatuses for supporting a firearm during gunsmithing operations.

BACKGROUND OF THE INVENTION

Users who wish to build or modify firearms, or otherwise engage in gunsmithing, need a means for maintaining stability of the firearm.

Some known devices, such as the Geissele Reaction Rod and Brownell's Barrel Extension Torque Tool, couple to the flanges of the barrel extension as well as an inside of the upper receiver. To use the Brownell's Barrel Extension Torque Tool, the user is to clamp the barrel nut wrench handle firmly in a bench vise, insert the barrel into the upper receiver, and finger tighten the barrel nut. The user should then slide the barrel through the wrench, insert the Torque Tool in the back of the receiver until the teeth lock into the locking lugs in the barrel extension, and apply torque with a torque drive through the Brownell's Tool to tighten the barrel nut. This device is functional; however, it can only be gripped along a longitudinal length extending out a rear of the upper receiver, placing excessive torque on the end of the tool.

As another example, the CROSSTAC Upper/Lower Block and The Flipper by DPMS are both made from polymer, but merely include a rectangular block that fits into the upper receiver. While these devises are also functional, it is desirable to provide greater support and stability when building or modifying a firearm.

Although present devices and methods are functional, they are not sufficiently efficient or otherwise satisfactory. Accordingly, a system and method are needed to address the shortfalls of present technology and/or to provide other new and innovative features.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

The present invention can provide a system and method for supporting a firearm during gunsmithing. In one exemplary embodiment, the present invention can include a gunsmithing block.

In some examples, the gunsmithing block has a first end for interfacing with a vice, and a second end shaped to interface with an upper receiver assembly of a firearm, the upper receiver assembly having an upper receiver, a bolt carrier without a bolt, and a barrel extension. In this example, the second end has an upper receiver mating portion shaped to interface with an interior region of the upper receiver and an interior region of the barrel extension.

In some examples, a gunsmithing block has an upper receiver mating portion shaped to mate with an interior region of an upper receiver of a firearm; a lower receiver mating portion opposing the upper receiver mating portion and shaped to interface with an interior region of a lower receiver of the firearm; an inner core having a metallic material and a bolt locking end; and an exterior body having at least a portion of the lower receiver mating portion, the exterior body substantially encasing the inner core such that the bolt locking end is exposed.

In some examples, a gunsmithing block for bracing a firearm has an upper receiver mating portion; a vice mating portion opposing the upper receiver mating portion; an inner core having a bolt locking end having a first material hardness; and an exterior body having a lower receiver mating portion and encasing a portion of the inner core such that the bolt locking end is exposed, the exterior body further having a plunger having a second material hardness. In these examples, the second material hardness is less than the first material hardness, and the plunger and the bolt locking end oppose one another along a central axis.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
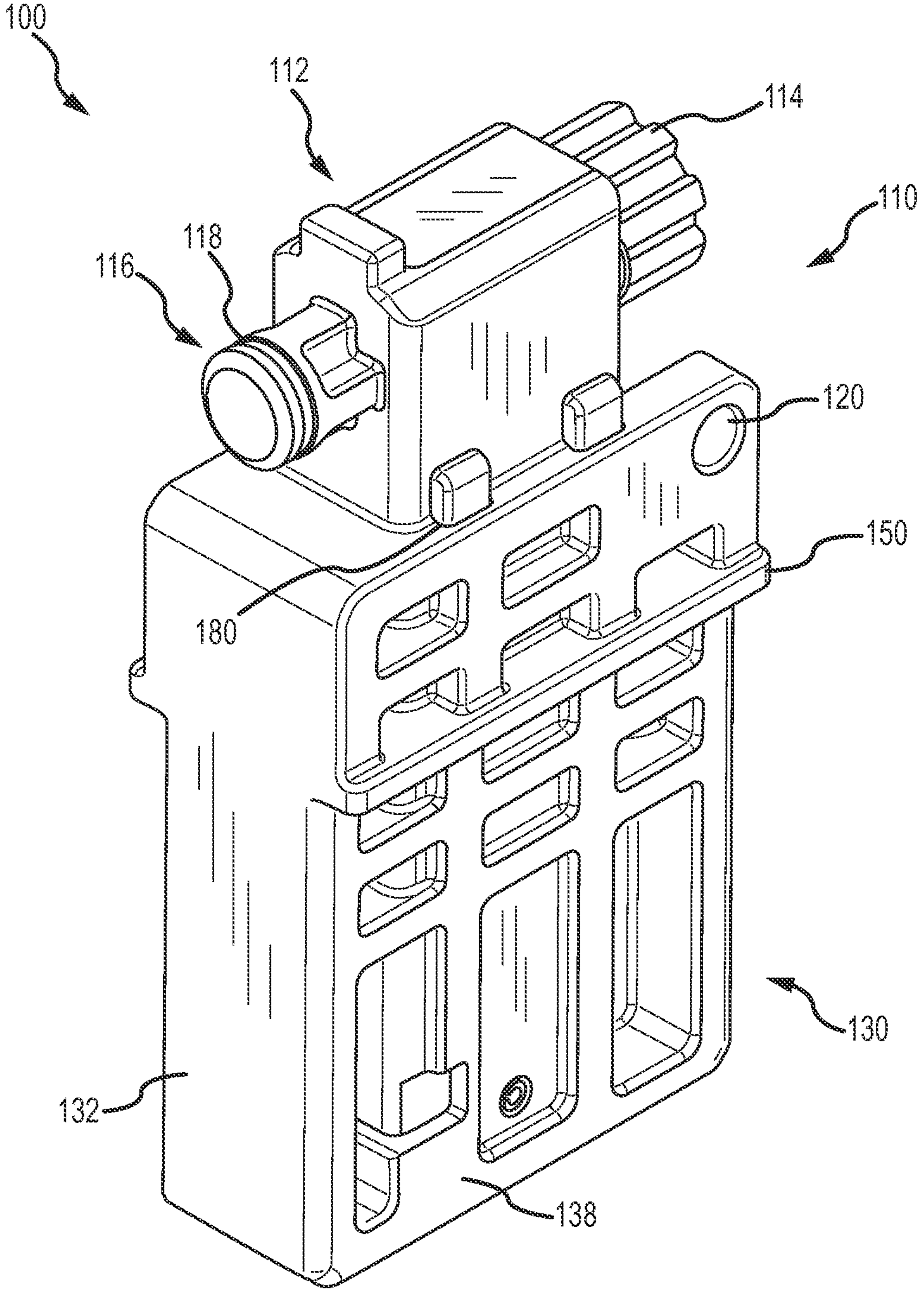
FIG. 1 illustrates a rear perspective view of an exemplary armorer's block.
Figure 2:
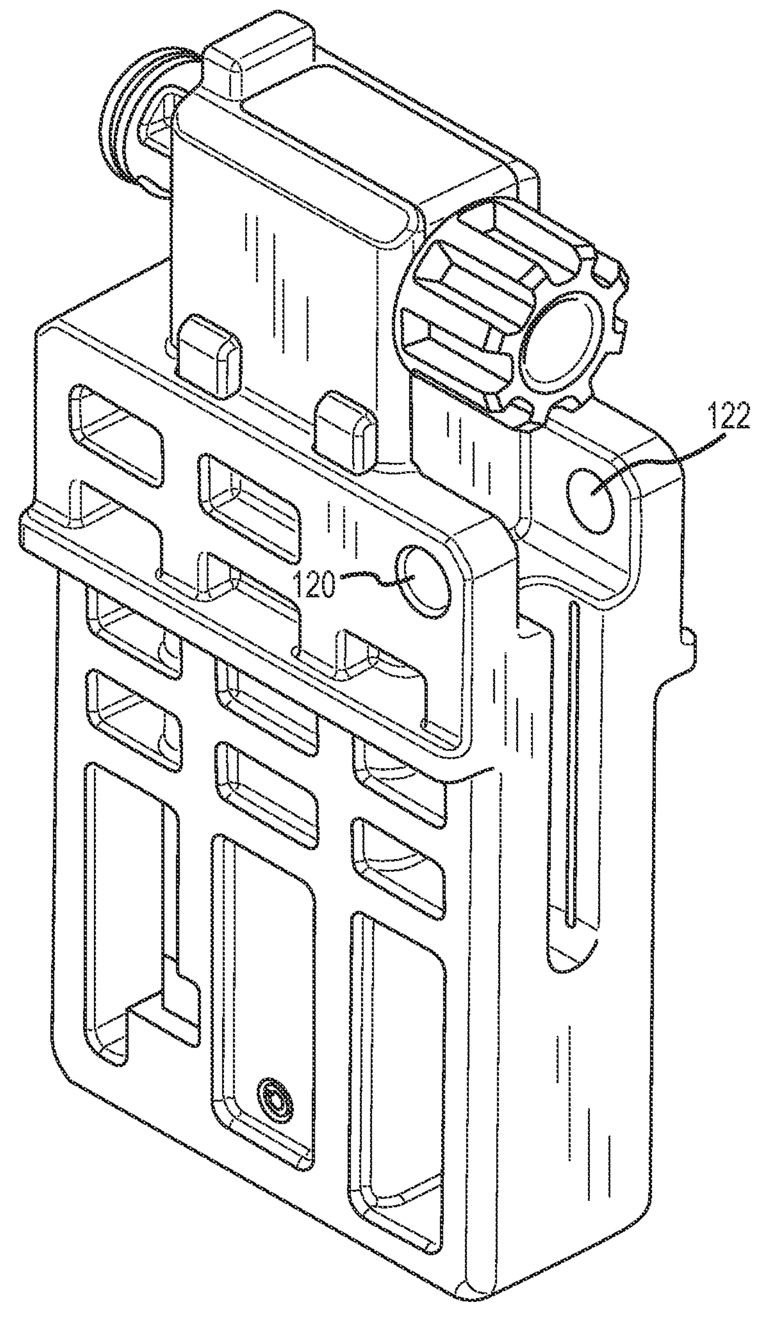
FIG. 2 is a front perspective view of an exemplary armorer's block.
Figure 3:
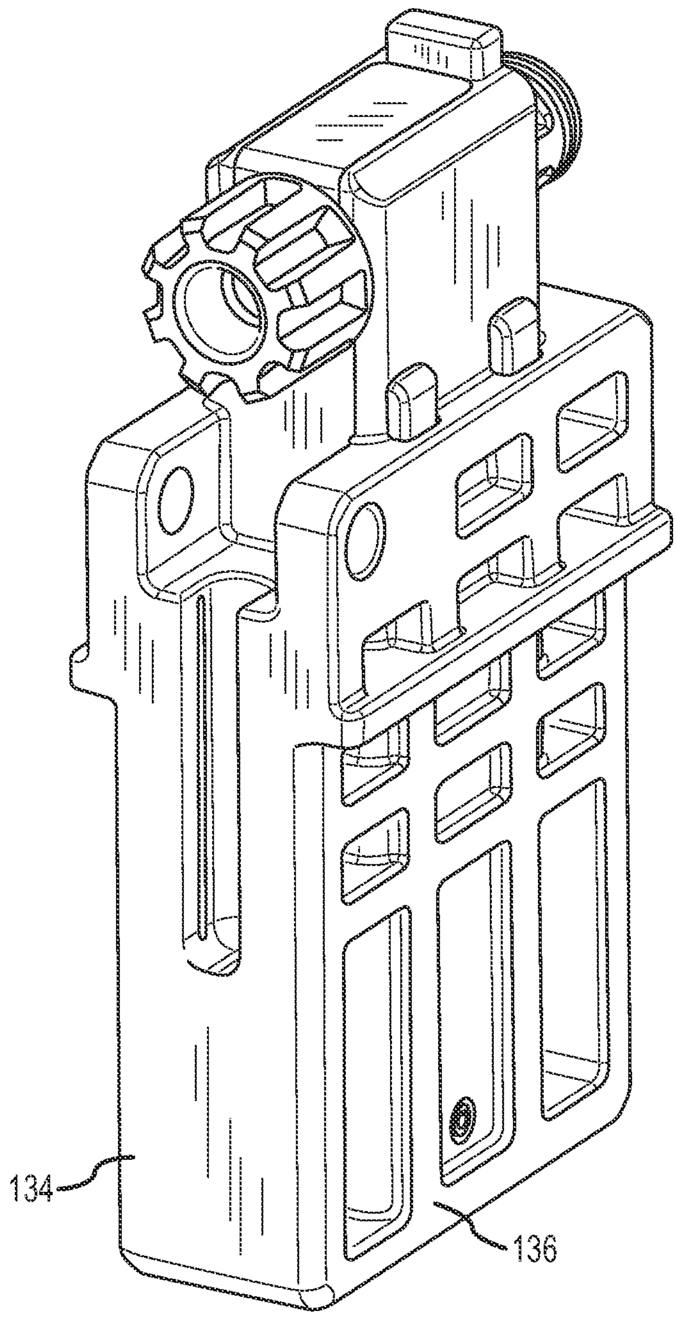
FIG. 3 is a second front view of the block in FIG. 2.
Figure 4:
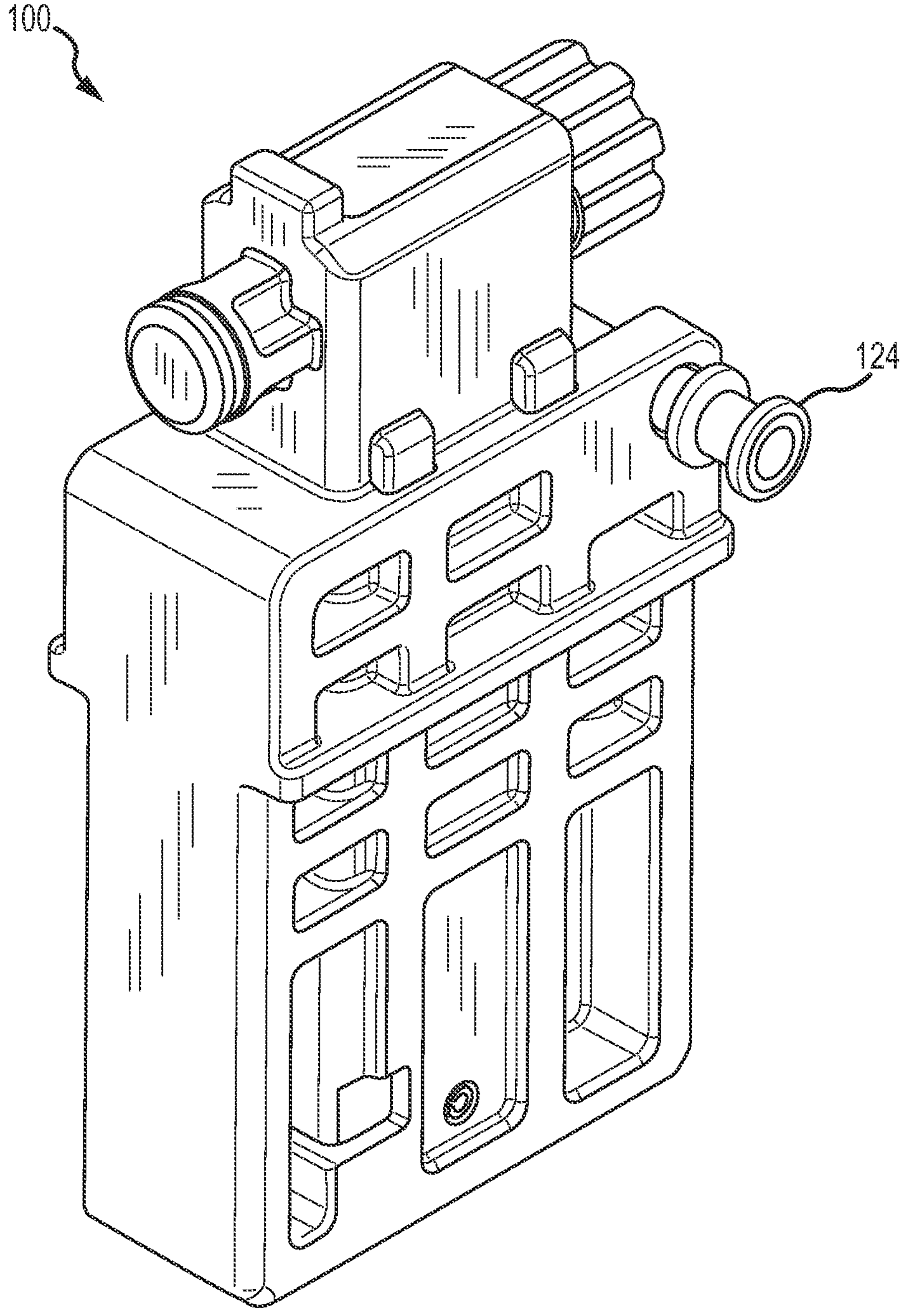
FIG. 4 is a rear perspective view of an exemplary armorer's block assembly.
Figure 5:
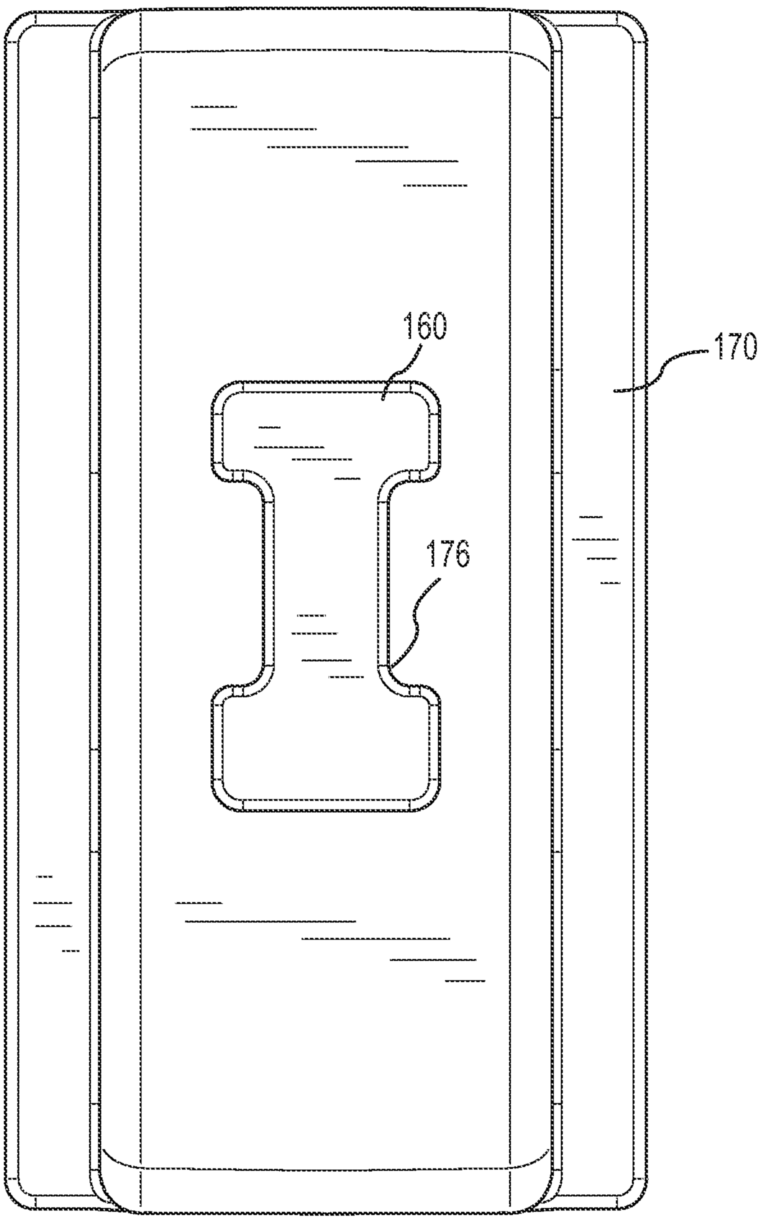
FIG. 5 is bottom view of an exemplary armorer's block.

The word "exemplary" is used herein to mean "serving as an example, instance, or illustration." Any embodiment described herein as "exemplary" is not necessarily to be construed as preferred or advantageous over other embodiments.

The present disclosure relates generally to a device to assist in gunsmithing, and in particular, to an armorer's block that can mate with an upper receiver or a lower receiver and thereby provide a way to couple either firearm component to a vice. For the purpose of this disclosure, the terms "gunsmith" and "armorer" and their related adjectives and verbs, are interchangeable, and shall broadly reference any person who is working on, building, modifying, or otherwise treating a firearm, whether as a hobby, sport, or occupation.

FIGS. 1-12 illustrate various views of a first embodiment of an armorer's block 100. The block 100 includes an upper receiver mating portion 110 and a lower receiver mating portion 130. The upper and lower receiver mating portions 110, 130 can be part of a single block of material or can be formed from two or more different pieces. Between the upper and lower receiver mating portions 110, 130 is a magazine well stop 150 arranged obliquely to a longitudinal axis of the block 100. As illustrated, the lower receiver mating portion 130 may include one or more recesses on the outer wall; these outer recesses may serve to allow portions of the block 100 to deform slightly and non-permanently as a vice is tightened about the block 100.

The upper receiver mating portion 110 can mate to an upper receiver, or subcomponents thereof, of a firearm such as an AR15 as seen in FIGS. 9-12. This mating involves a bolt replacement portion 112 comprising a bolt locking end 114 and a plunger 116. The bolt locking end 114 includes a plurality of radial flanges extending radially outward from a longitudinal axis of the bolt replacement portion 112. The bolt locking end 114 is designed to replicate a front end of a bolt such that the radial flanges are designed to slide through the flanges of a barrel extension 2450 and mate with the barrel extension of an upper receiver (see FIG. 12). The plunger 116 may include a friction element, such as a gasket 118, a packing, a covering, a filling a padding, or a buffer, and this combination replicates the bolt gas rings of a bolt. In some embodiments, the friction element may include a replacement ring similar to the original gas ring or a spiral type ring; however, it should be understood that any suitable friction element is contemplated. The plunger 116 can slide in and out of a bolt carrier and the gasket 118 creates sufficient friction so that the upper receiver mating portion 110 remains securely mated to the bolt carrier when the block 100 is mated to an upper receiver. When the upper receiver mating portion 110 mates to an upper receiver, the bolt locking end 114 and the plunger 116 mate with the upper receiver in a similar but not identical fashion to the bolt that the bolt replacement portion 112 replaces. In this way, the upper receiver mating portion 110 more securely mates with an upper receiver than known vice blocks in the art and thereby enables greater torque to be applied to the barrel nut and other portions of the upper receiver while decreasing the risk of damaging the upper receiver during gunsmithing operations.

It should be noted that an alignment feature 180 (see e.g. FIG. 1) may also be provided as part of the upper receiver mating portion 110. The alignment feature 180 may be one or more raised sections, protrusions, or flanges that engage an upper receiver directly while also providing a locating and support function. Specifically, the alignment feature 180 may ensure the bolt locking end 114 may be properly inserted in the barrel extension.

Figure 9:
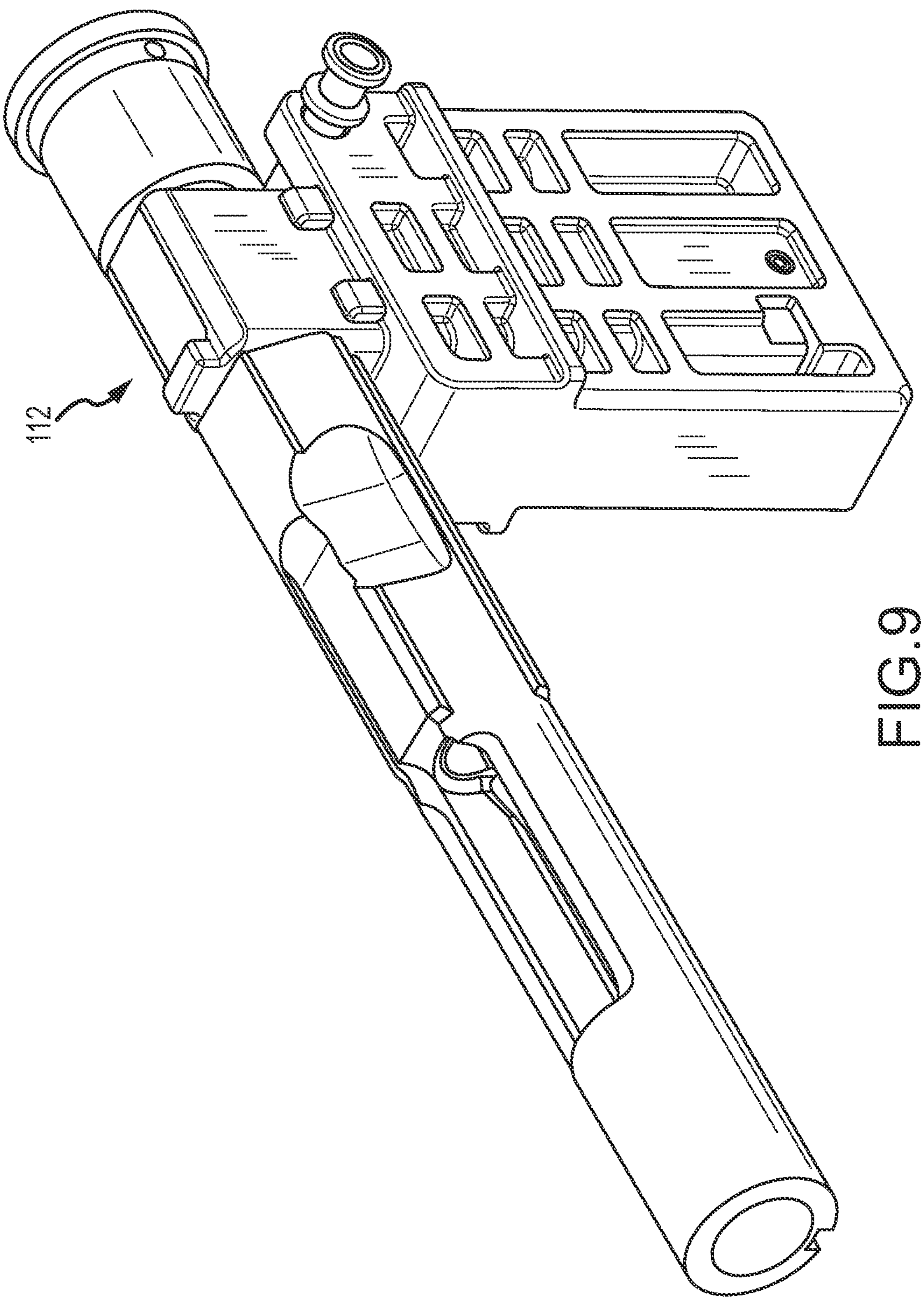
FIG. 9 illustrates an exemplary armorer's block with components of an upper receiver assembly thereon.

FIG. 9 shows the block 100 mated to a bolt carrier and a barrel extension without showing other elements of the upper receiver. From this it can be more easily seen how the bolt replacement portion 112 replicates the interaction of the bolt with both the bolt carrier and the barrel extension.

Figure 10:
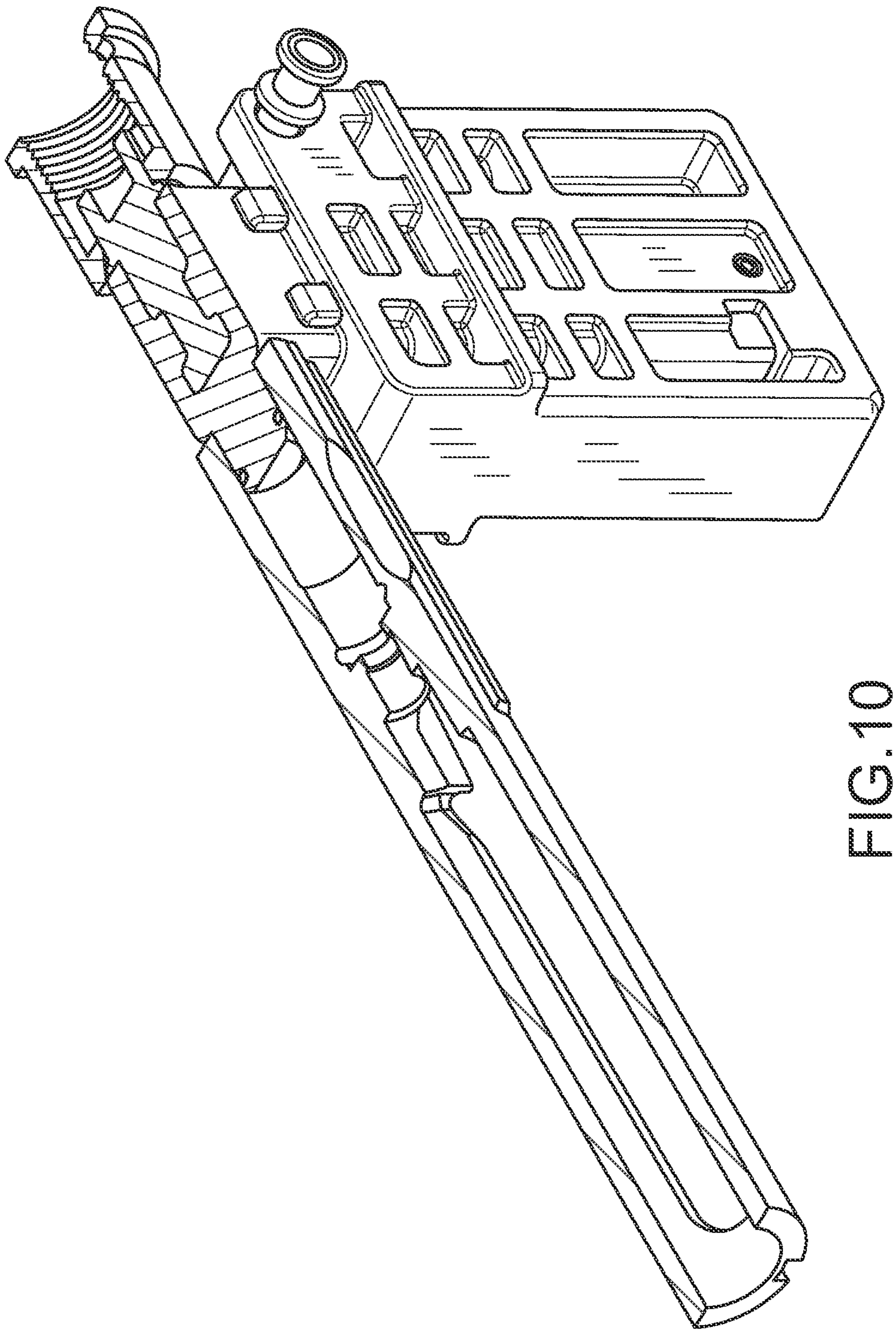
FIG. 10 is a cross section of the components illustrated in FIG. 9.

FIG. 10 shows a cross section of the components illustrated in FIG. 9.

In order to use the block 100, the upper and lower receivers of a firearm are separated and the bolt carrier group is removed. The bolt is removed from the bolt carrier group. The block 100 is then inserted into the upper receiver, the bolt locking end 114 being mated with the barrel extension. The bolt carrier, without the bolt, is then inserted back into the upper receiver and mated with the plunger 116 and pushed forward until the bolt carrier cannot move forward any further because it impinges on the block 100. In this way the block 100 keeps the bolt carrier in a partially open position (see FIGS. 9-12).

Figure 11:
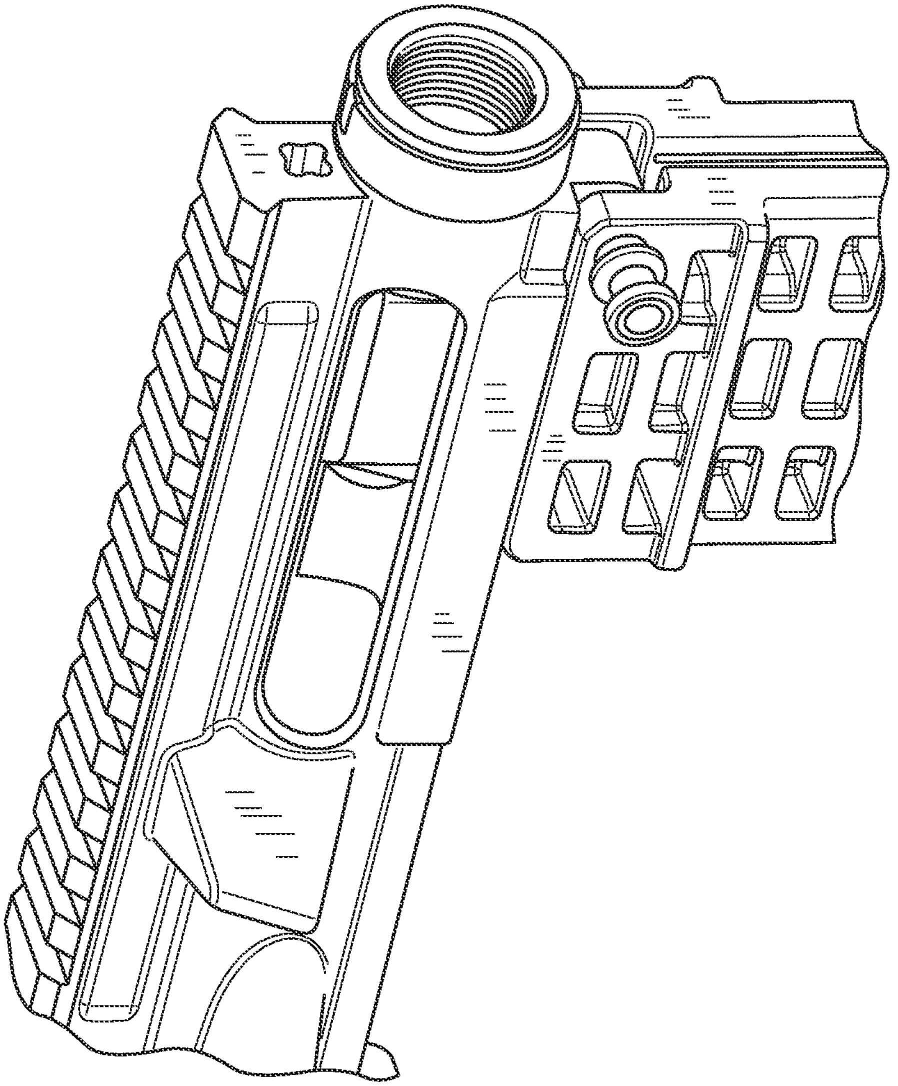
FIG. 11 illustrates an exemplary armorer's block with an upper receiver with a bolt carrier and barrel extension assembled thereon.
Figure 12:
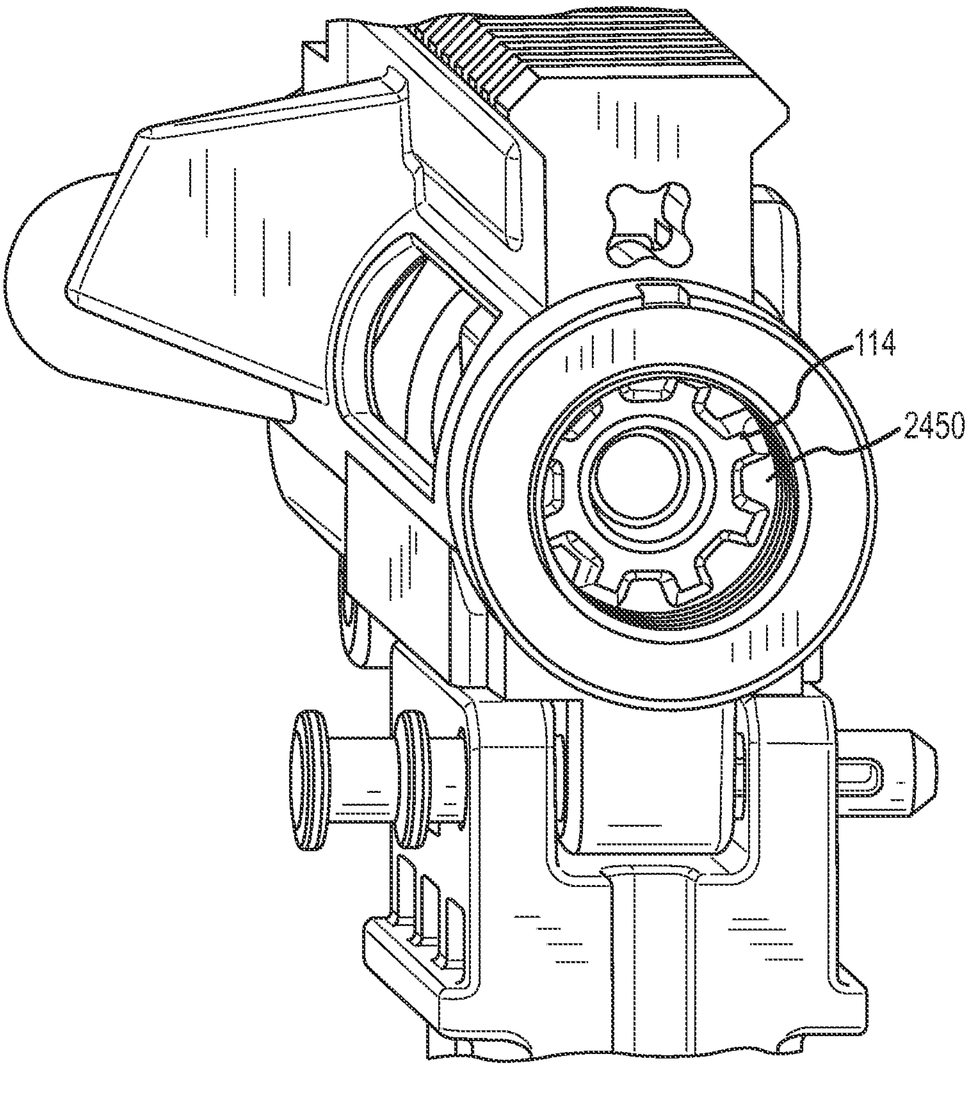
FIG. 12 illustrates an interface between an exemplary armorer's block and a barrel extension located within an upper receiver.

FIG. 11 shows the block 100 mated to an upper receiver and in particular mated to the bolt carrier and barrel extension thereof.

The upper receiver mating portion 110 also can include first and second takedown pin apertures 120, 122 and a takedown pin 124 (or a takedown pin from the firearm can be used). The first and second takedown pin apertures 120, 122 can be arranged near a front of the upper receiving mating portion 110 and can be arranged perpendicular to a longitudinal axis of the firearm barrel or bolt. Once the upper receiver is mated with the block 100, a takedown pin hole of the upper receiver will be aligned with the take down pin apertures 120, 122 such that the take down pin can be inserted through the take down pin apertures 120, 122 as well as the take down pin hole, thereby further affixing the block 100 to the upper receiver. In particular, while the bolt locking end 114 passes into the flanged region of the barrel extension, the bolt locking end 114 does not rotate and thereby lock into the barrel extension as a bolt does when ready to fire. Therefore, there is a possibility that the upper receiver can move forward relative to the block 100 and can damage the barrel extension. When the take down pin hole is coupled to the take down pin apertures 120, 122 via the take down pin, the upper receiver is unable to slide forward relative to the block 100. The takedown pin apertures 120, 122 also assist in alignment of the block 100 with the upper receiver. Because the takedown pin only fits through the takedown pin apertures 120, 122 when it is aligned with the takedown pin holes, the coupling of these components longitudinally aligns the block 100 and upper receiver. This is especially important since most of the interaction of the upper receiver mating portion 110 and the upper receiver is blind—that is, not visible to the user.

The block 100 can be formed of an inner portion 160 and an outer portion 170. These two portions 160, 170 appear seamless in most figures and in the product, but can be manufactured separately and then combined to form the final block 100. In some embodiments the inner portion 160 and the outer portion 170 can be formed of different materials. For instance, the inner portion 160 can be formed from a stronger, yet possibly more brittle material (e.g., metal), while the outer portion 170 can be formed from a weaker, yet possibly less brittle material (e.g., polymer).

Figure 6:
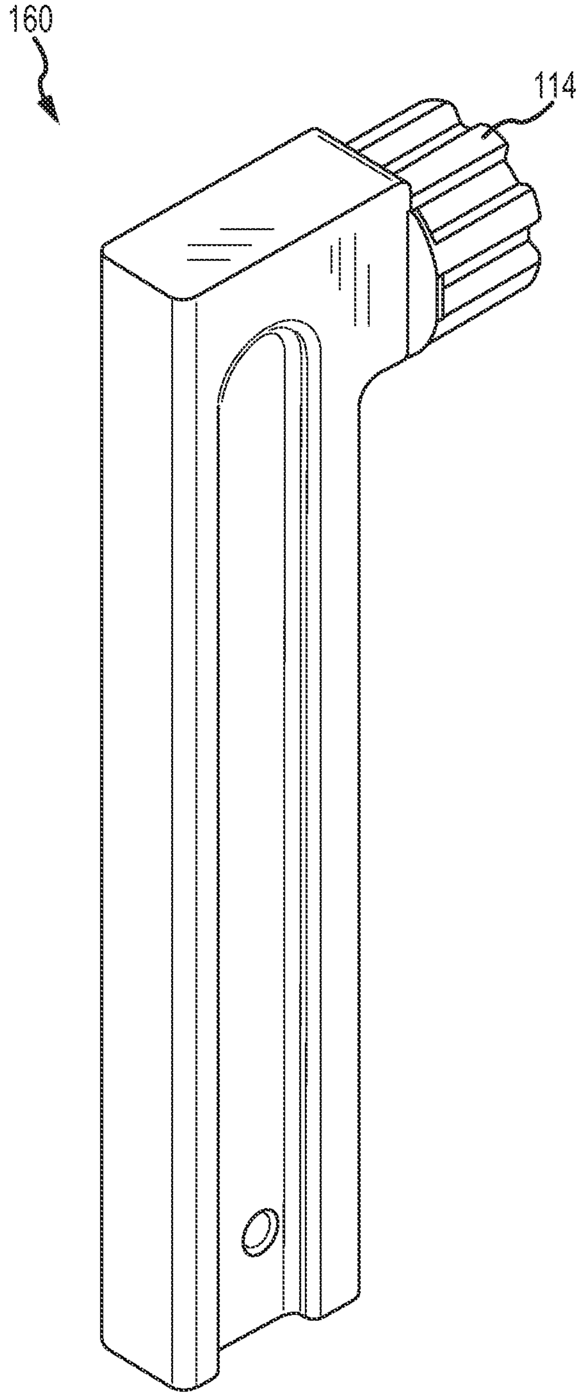
FIG. 6 is a rear perspective view of an exemplary inner portion of an armorer's block.
Figure 7:
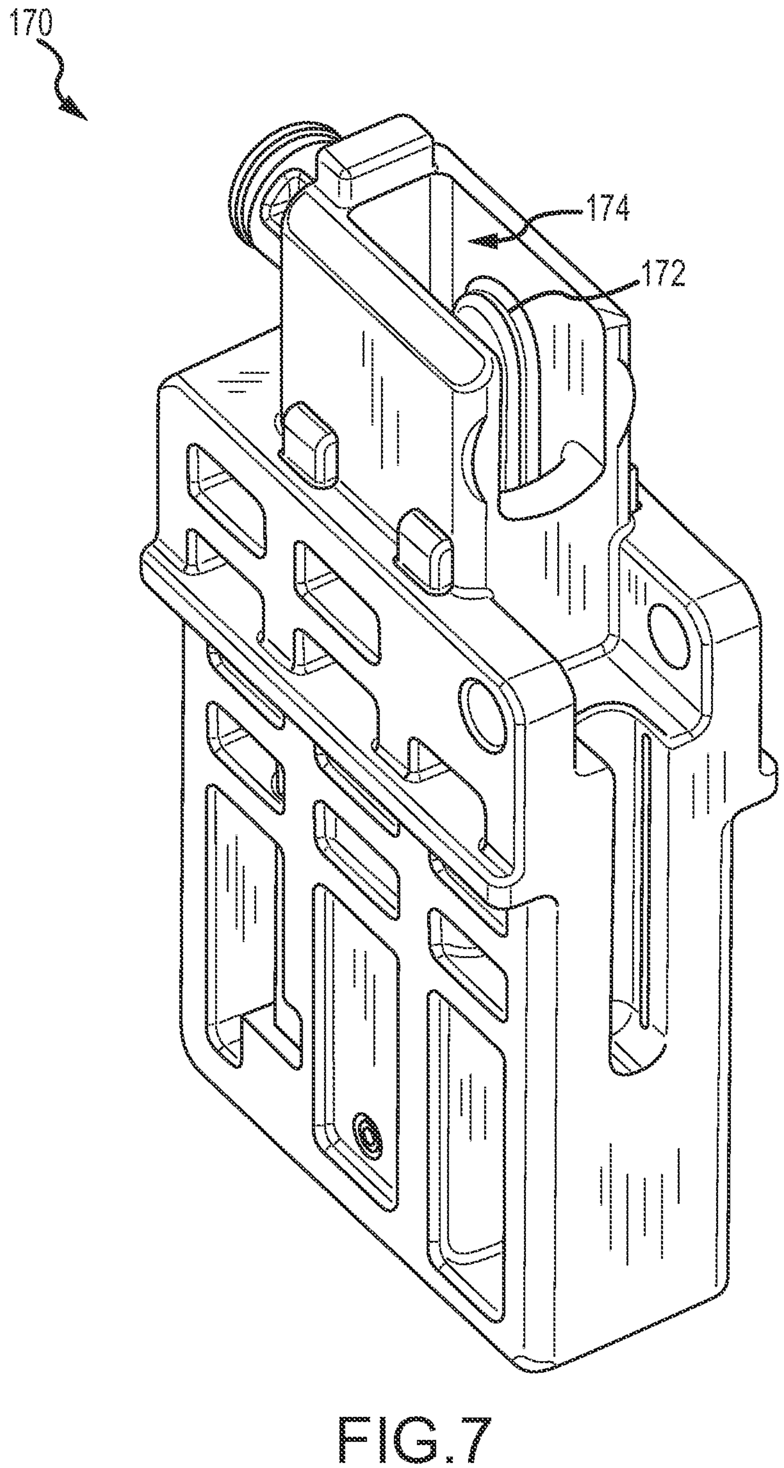
FIG. 7 is a front perspective view of an exemplary outer portion of an armorer's block.

The inner portion 160 can be seen best in FIG. 6. The inner portion 160 can include the bolt locking end 114 and can run from a top to a bottom of the block 100 thus providing a skeleton or backbone to the block 100 that increases the overall resistance to torsion and bending of the block 100. A cross section of the inner portion 160 when viewed from a top or bottom can resemble the profile of an I-beam, and this profile provides greater strength for a reduced amount of material. This can be important where the inner portion 160 is formed from a more expensive material than the outer portion 170.

The outer portion 170 can include vertical protrusions 172 along the inside side surfaces of a slot 174 formed to accept the inner portion 160. The vertical protrusions 172 can be shaped and sized to engage with the I-beam structure of the inner portion 160. These vertical protrusions 172 can extend toward (and optionally to) a bottom of the outer portion 170 thereby forming an I-beam shaped cavity 176 shaped to encapsulate the inner portion 160 (see e.g. FIG. 5).

Figure 8:
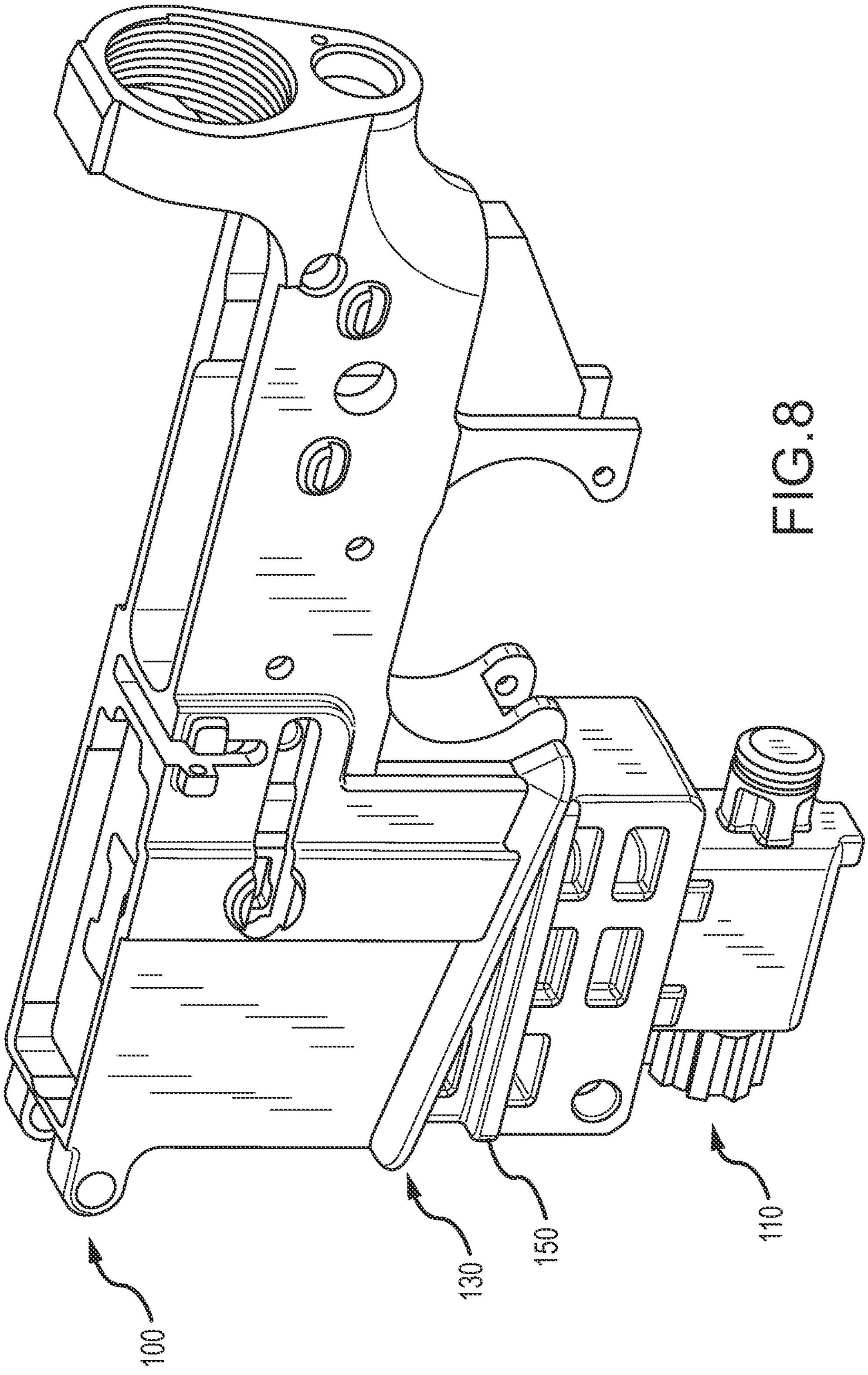
FIG. 8 illustrates an exemplary armorer's block with a lower receiver assembled thereon.

FIG. 8 shows the block mated to a lower receiver via the magazine well. The lower receiver mating portion 130 can be rectangular and have a front and back side 132, 134 and a left and right side 136, 138 (see e.g. FIGS. 1 and 3) where the left and right sides 136, 138 are longer than the front and back sides 132, 134. The lower receiver mating portion 130 can have dimensions designed to be equal to or slightly smaller than those of a magazine well of a lower receiver of a firearm, such as an AR15, such that the lower receiver mating portion 130 can fit snugly into a magazine well.

The magazine well stop 150 can be arranged around a midplane of the block 100 and can circumscribe one or more portions of the block 100 or wrap completely around the block 100. As illustrated, the magazine well stop 150 has left and right portions that run along a longitudinal length of left and right sides of the block 100. The magazine well stop 150 is designed to act as a barrier to the magazine well when the block 100 is mated with a lower receiver so that the block 100 does not pass too far into a magazine well and further to provide added support and mating stability between the block 100 and a lower receiver.

Figure 13:
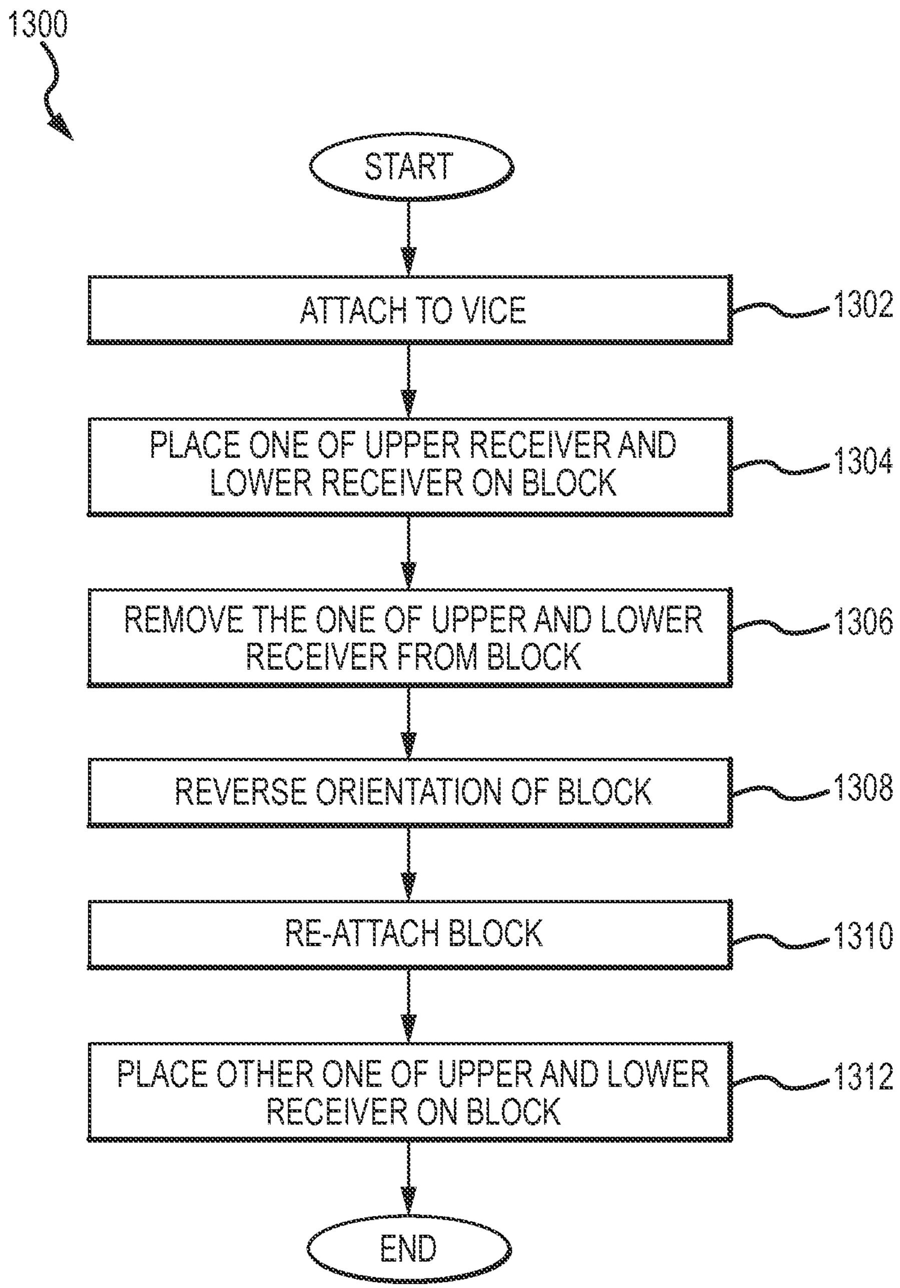
FIG. 13 is a flowchart illustrating a method of using an armorer's block.

Turning now to FIG. 13, a method 1300 of using an armorer's block is now described. The method 1300 includes attaching 1302 a block to a vice, placing 1304 one of an upper receiver and a lower receiver of a firearm on the block, removing 1306 the one of the upper and lower receiver from the block, reversing 1308 an orientation of the block, reattaching 1310 the block to the vice, and placing 1312 the other one of the upper and lower receiver on the block.

Attaching 1302 a block to a vice includes one of inserting a first end into a vice and inserting a second end into a vice, and tightening the vice about the one of the first end and the second end. Attaching 1302 may include allowing a stop or ledge in the block to limit vertical drop of the block before the vice is firmly tightened. Attaching 1302 may be achieved using the block 100 described with reference to any one of FIGS. 1-12.

Placing 1304 includes placing one of an upper receiver and a lower receiver of a firearm on the block. In some embodiments, placing 1304 includes placing an upper receiver on the block, sliding a barrel extension over a bolt locking end, and inserting a pin through the upper receiver and a pin aperture in the block to limit movement of components of the upper receiver relative to the block. In some embodiments, placing 1304 includes placing a lower receiver on the block by sliding a lower receiver over the block until the lower receiver abuts a stop. The upper and lower receiver can be placed onto separate or opposing ends of the block. Placing 1304 may be achieved using the block 100 described with reference to any one of FIGS. 1-12.

Removing 1306 includes removing the one of the upper receiver and the lower receiver from the block. In some embodiments, removing 1306 includes sliding the barrel extension off a bolt locking end, and removing a pin from the upper receiver and a pin aperture in the block to the upper receiver to be lifted from the block. In some embodiments, removing 1306 includes lifting a lower receiver from the block by sliding the lower receiver off the block. Removing 1306 may be achieved using the block 100 described with reference to any one of FIGS. 1-12.

Reversing 1308 includes reversing an orientation of the block relative to the vice. Reversing can include removing the block from the vice, and turning the vice upside-down relative to the first orientation.

Reattaching 1310 includes the other one of inserting a first end into a vice and inserting a second end into a vice, and tightening the vice about the one of the first end and the second end. Reattaching 1310 may include allowing a stop or ledge in the block to limit vertical drop of the block before the vice is firmly tightened. Reattaching 1310 may be achieved using the block 100 described with reference to any one of FIGS. 1-12.

Placing 1312 includes placing the other one of an upper receiver and a lower receiver on the block in a manner similar to that described with reference to placing 1304. Placing 1312 may be achieved using the block 100 described with reference to any one of FIGS. 1-12.

Figure 14:
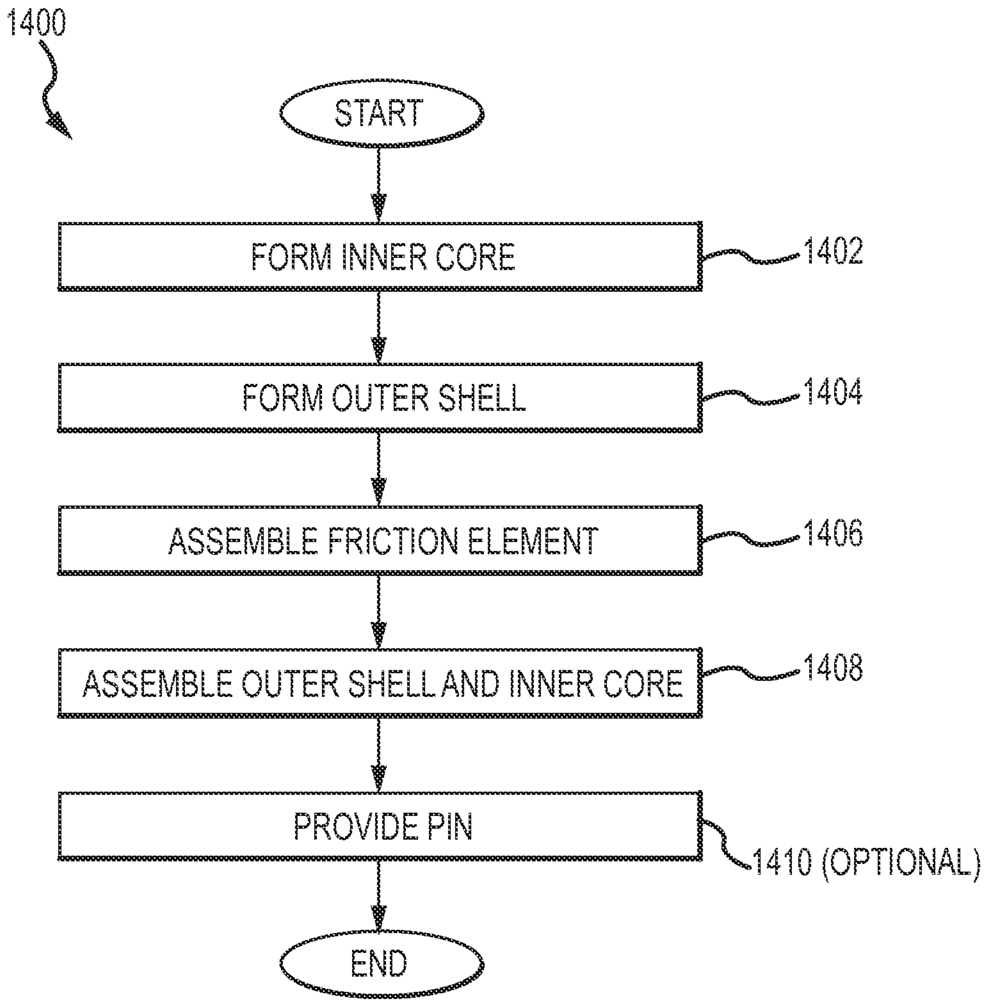
FIG. 14 is a flowchart illustrating a process of making an armorer's block.

Turning now to FIG. 14, a process 1400 of making an armorer's block is now described. The process 1400 includes forming 1402 an inner core, forming 1404 an outer shell, assembling 1406 a friction element, assembling 1408 the outer shell and inner core, and optionally providing 1410 a pin.

Forming 1402 an inner core includes shaping an inner core from a material that is harder than the outer shell, such as by casting or otherwise forming a blank, hardening the blank, and performing a final cutting operation. Forming 1402 may include providing a low cost metallic material such as, for example only, iron or steel, and heat treating, rolling, or otherwise hardening the metallic material to achieve a desirable strength and ductility. Forming 1402 an inner core includes shaping a longitudinal base structure and a bolt locking end at one end of the longitudinal base structure, the bolt locking end having a central axis that traverses a central axis of the longitudinal base structure. In some embodiments, forming 1402 includes hardening at least a portion of the bolt locking end to a Rockwell hardness that is greater than that of the longitudinal base structure. Forming 1402 an inner core may provide an inner core similar to the inner portion 160 described with reference to FIGS. 1-12.

Forming 1404 an outer shell includes shaping an outer shell that is suitable for encompassing a portion of the inner core and exposing at least the bolt locking end of the inner core such that the bolt locking end can attach to a firearm as described in previous sections of this disclosure. Forming 1404 also includes forming a plunger and at least a portion of a bolt replacement portion at one end of the outer shell. Forming 1404 an outer shell can include forming vertical protrusions along the inside side surfaces of a slot formed to accept the inner core, the vertical protrusions shaped as described in previous sections of this disclosure. Forming 1404 an outer shell may be accomplished by forming a shell from a relatively soft material such as a polymer. Of note, the material chosen should not be so weak as to permanently deform under the expected loading forces of a vice or torque forces applied by a user, but should not be so hard as to scratch a firearm when it is attached to the end product. Forming 1404 an outer shell may include molding or otherwise shaping a polymer into a shape that is suitable for encompassing a portion of the inner core, and may further include molding or otherwise shaping a right side and a left side of an outer shell that, when combined, are suitable for encompassing a portion of the inner core. Forming 1404 may be achieved by providing an outer portion 170 such as that described with reference to FIGS. 1-12.

Assembling 1408 the outer shell to the inner core may include attaching a right and left side of an outer shell or outer portion 170 to an inner core and fastening the outer shell to the inner core using one or more fasteners, or assembling 1408 may include sliding a unified outer structure over a portion of the inner core, and permanently or semi-permanently attaching the outer shell to the inner core using only a single fastener. In some embodiments, assembling 1408 the outer shell to the inner core may performed simultaneously with forming an outer shell 1404, for example, by molding a polymer having the general desired shape of the outer shell directly about a portion or all of the inner core (e.g., sometimes referred to as "overmolding"). Some embodiments may further include removing a portion of the molded polymer to expose the bolt locking end of the inner core. Specifically, a plunger may be provided by the outer shell, while a bolt locking end may be provided by the inner core.

Some embodiments may optionally include providing 1410 a takedown pin, such as a takedown pin manufactured of a hard material such as a metallic material and suitable for inserting through a takedown pin aperture. Providing 1410 may be accomplished by providing a takedown pin as described with reference to FIGS. 1-12.

The presently disclosed embodiments have various advantages over the prior art, such as greater stability and allowing greater gunsmithing torques to be applied to the upper receiver. Further, the currently disclosed embodiments are far more compact than the prior tools and can be manufactured with far less metal and are thus less expensive. Further, a vice can more effectively clamp onto a deformable plastic such as the lower receiver mating portion 130 disclosed herein, as compared to the metal of the prior art tools. The use of plastic versus metal also decreases the risk of the block scratching a user's firearm. Additionally, the prior art tools are only able to resist forward movement of the upper receiver via the friction fit of the tool with the bolt carrier and the barrel extension. In contrast, the presently disclosed embodiments prevent longitudinal shifting of the upper receiving via a further coupling with the take down pin and take down pin hole of the upper receiver.

The presently disclosed embodiments further improve upon the prior art by recognizing that the interaction between any block or vice and the interior of the upper receiver is blind to the user, and therefore alignment is difficult. By coupling to the takedown pin hole and the takedown pin, the presently disclosed embodiments ensure longitudinal alignment of the block and upper receiver.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A gunsmithing block, comprising:
an upper receiver mating portion comprising a first cavity and a cylindrical plunger opposing a cylindrical bolt locking end, the plunger and bolt locking end arranged concentrically along a central axis, the bolt locking end being part of an inner core having a first portion arranged within the first cavity; and
a lower receiver mating portion having a substantially rectangular cross section and extending obliquely away from the central axis, the lower receiver mating portion including a second cavity wherein at least a second portion of the inner core is arranged within the second cavity.

2. The gunsmithing block of claim 1, wherein:
the bolt locking end comprises a plurality of radial flanges extending radially outward from the central axis.

3. The gunsmithing block of claim 2, wherein:
the plunger comprises a friction element at least partially encircling the plunger.

4. The gunsmithing block of claim 3, wherein:
the friction element comprises at least one of a gasket, a packing, a covering, a filling a padding, a gas ring replacement, and a buffer.

5. The gunsmithing block of claim 1, further comprising:
at least one takedown pin aperture arranged on the upper receiver mating.

6. The gunsmithing block of claim 1, further comprising:
a travel stop between the lower receiver mating portion and the upper receiver mating portion.

7. The gunsmithing block of claim 1, wherein:
the inner core is unitary with the bolt locking end and extends through the first cavity thereby exposing the bolt locking end;
the bolt locking end comprises a material having a first hardness;
the upper receiver mating portion comprises a material having a second hardness; and wherein
the second hardness is less than the first hardness.

8. The gunsmithing block of claim 1, wherein:
a portion of the upper receiver mating portion comprises a material that is harder than at least a portion of the lower receiver mating portion.

9. A gunsmithing block, comprising:
an exterior body comprising an upper receiver mating portion and a lower receiving mating portion; the upper receiver mating portion including a central axis;
the lower receiver mating portion opposing the upper receiver mating portion and arranged obliquely to the central axis; and
an inner core comprising a bolt locking end, the exterior body substantially encasing the inner core such that the bolt locking end is exposed.

10. The gunsmithing block of claim 9, further comprising:
a travel stop between the upper receiver mating portion and the lower receiver mating portion.

11. The gunsmithing block of claim 9, wherein:
the upper receiver mating portion comprises a plunger opposing the bolt locking, the bolt locking end comprising a material that is harder than the plunger.

12. The gunsmithing block of claim 9, wherein a central axis passes through the plunger and the bolt locking end.

13. The gunsmithing block of claim 12, wherein the lower receiver mating portion extends obliquely away from the central axis.

14. The gunsmithing block of claim 12, wherein the central axis a long axis of the inner core are oblique.

15. A gunsmithing block for bracing a firearm, comprising:

an exterior body comprising an upper receiver mating portion, a lower receiving mating portion, and a plunger having a first material hardness;

the lower receiver mating portion opposing the upper receiver mating portion;

an inner core comprising a bolt locking end having a second material hardness; and the lower receiver mating portion and encasing a portion of the inner core such that the bolt locking end is exposed; wherein the second material hardness is greater than the first material hardness; and the plunger and the bolt locking end oppose one another along a central axis.

16. The gunsmithing block of claim 15, wherein:

the inner core comprises a metallic material; and the exterior body comprises a polymer.

17. The gunsmithing block of claim 15, further comprising a lower-receiver travel stop between the upper receiver mating portion and the lower receiver mating portion.

18. The gunsmithing block of claim 15, wherein the central axis and a long axis of the inner core are oblique.

* * * * *